Jan. 8, 1935. J. L. ANDREWS 1,987,043
MIXER
Filed Jan. 30, 1934
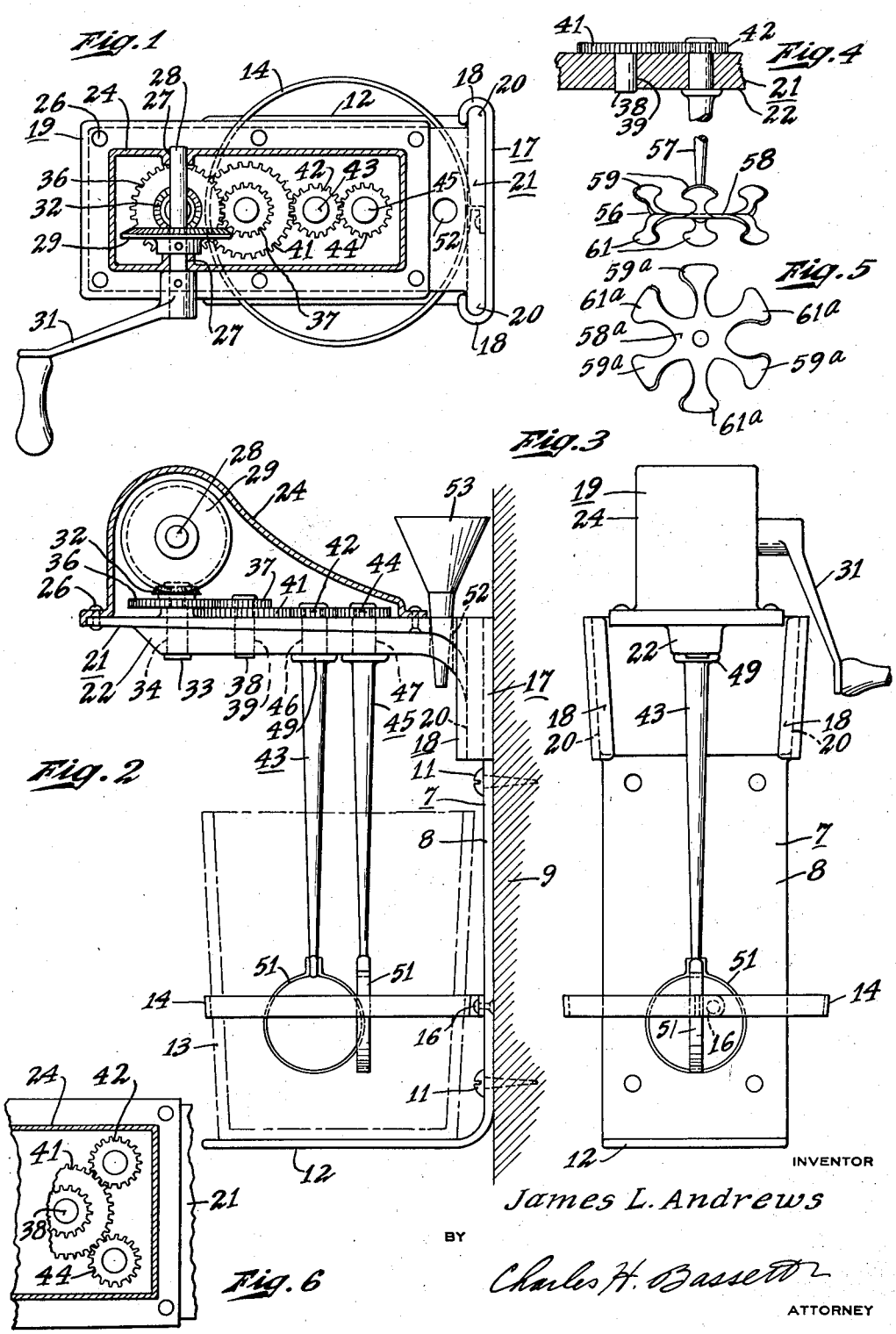

Patented Jan. 8, 1935

1,987,043

UNITED STATES PATENT OFFICE 1,987,043

MIXER

James L. Andrews, Birmingham, Ala.

Application January 30, 1934, Serial No. 708,989

1 Claim. (Cl. 259—104)

My invention relates to mixers and more particularly to hand operated mixers adapted for use in beating eggs, whipping cream, making salad dressing, etc., and has for its objects the provision of a device which can be quickly and easily assembled when it is to be used, and readily disassembled after use to permit the removal of the whipping bowl, and to clean the beating blades by holding them under a faucet.

Another object of my invention is to provide a mixer which will expeditiously complete the beating or whipping operation, and necessitate the expenditure of a minimum amount of effort on the part of the user.

A further object of my invention is to provide a mixer which is reliable in operation, inexpensive in construction, and which can be mounted for use in the most suitable location in a room, such as on a wall, cabinet, or table.

Briefly, my invention comprises a bracket which is adapted to be secured to a wall or table and provided with a base portion and clip to receive a whipping bowl. A tapered socket is provided at the upper end of the bracket to detachably receive a mixing mechanism embodying a gear transmission which is actuated by the user by means of a crank handle. A pair of beating blades are journaled in the mixing mechanism housing and rotated in opposite directions by the gear transmission, as shown in the preferred form in the drawing and described hereinafter, in the specification, and the blades shown in the modified form are disclosed rotating in the same direction.

Apparatus embodying features of my invention is illustrated in the accompanying drawing forming a part of this application, in which:

Fig. 1 is a plan view of my preferred form of mixer with the cover broken away,

Fig. 2 is a side elevational view of the preferred form of mixer with the cover broken away and the handle removed, Fig. 3 is a front elevational view of the preferred form of mixer, Fig. 4 is a side elevational view of a modified form of agitator blade, Fig. 5 is a bottom view of another modified form of agitator blade, and Fig. 6 is a fragmentary plan view illustrating the manner in which the intermediate driving gear engages the beater pinions when the beaters are equipped with agitators such as are shown in Figs. 4 and 5.

Referring now to the drawing for a better understanding of my invention, I show in Figs. 1, 2, and 3 the preferred form which embodies a bracket 7 provided with a body portion 8 adapted to be secured to a wall or table 9 by means of screws 11. A bowl supporting flange 12 projects outwardly from the body portion to receive a whipping bowl 13 which is held against displacement thereon by a circular band 14 secured to the body portion by a rivet 16. At the upper end of the body portion is provided a socket portion 17 formed by a pair of downwardly converging ears 18 which are bent outwardly from the body portion and then bent inwardly towards each other.

The mixer mechanism, which is indicated generally at 19, embodies a base 21 provided with a downwardly converging side flange 20 adapted to be engaged by the ears 18 when the mixer mechanism is mounted on the bracket 7 ready for use. Extending along the under side of the base 21 is formed a stiffening web 22 which also serves to provide relatively long bearings for the gear stud shafts and beater blade journals which will be described later.

A cover 24 is secured to the base 21 by means of rivets 26 and is provided with bearings 27 to receive a bevel gear driving shaft 28. Secured on the driving shaft 28 under the cover 24 is provided a driving bevel gear 29 which is adapted to be turned by means of a crank handle 31 mounted on the end of the shaft. The bevel gear 29 meshes with a relatively small driven bevel gear 32 which is secured to a stud shaft 33 journaled in a bearing 34 provided in the base 21.

Secured to or formed integral with the bevel gear 32 is provided a large driving pinion 36 which meshes with a relatively small driven pinion 37 secured on a stud shaft 38 journaled in the bearing 39. An intermediate driving pinion 41 is also secured to the shaft 38 to drive a beater pinion 42 secured to the upper end of a beater 43. The beater pinion 42 meshes with a pinion 44 secured to the other beater 45 thereby causing the beaters to revolve in opposite directions.

The beaters 43 and 45 are provided with journals 46 and 47 to rotate in the bearings formed in the base 21 and are held against displacement by collar flanges 49 and pinions 42 and 44. Secured at the lower end of each beater is provided a circular blade 51 formed of thin narrow material and disposed at right angles to each other. An aperture 52 is provided in the base 21 to receive a funnel 53 when the mixer is employed in making salad dressing.

Referring now to Fig. 4, I show a modified form of agitator 56 secured at the end of a beater shaft 57. This agitator has a body portion 58 and a plurality of upwardly extending blades 59 and downwardly projecting blades 61. As shown, the blades alternately extend upwardly and downwardly about the agitator body and without being pitched to displace material vertically.

The modified form of agitator illustrated in Fig. 5 is provided with a body portion 58a, upwardly extending blades 59a and downwardly extending blades 61a all of which are similar to those shown in Fig. 4, but in this form the blades 59a are pitched to propel the mixture towards the blades 61a, and the blades 61a are pitched to propel the mixture into the path of the blades 59a.

When the modified form of agitator is employed in small mixers, one beater will be sufficient, and in larger mixers two beaters can be employed and driven in the same direction by the intermediate driving gear 41 as shown in Fig. 6. It will also be understood that two agitators can be mounted, one above the other, on the same beater shaft, if desired.

It will be seen readily that I have devised an improved mixer which, due to the train of gears and sturdy mounting, will permit an operator to rotate the beaters at very high speeds with little effort, and that the mixer mechanism can be removed readily from the socket formed in the bracket by raising it upwardly.

While I have shown my invention in several forms, it will be obvious to those skilled in the art that it is not so limited but is susceptible of various changes and modifications without departing from the spirit thereof and I desire therefore that only such limitations shall be placed thereupon as are imposed by the prior art or as are specifically set forth in the appended claim.

What I claim is:

In a mixer, a bracket provided with a horizontally disposed bowl supporting flange, socket means provided at the upper end of the bracket, a base detachably mounted in the socket means, a pair of beaters journaled in the base, a pair of co-acting pinion gears secured on the beaters, a cover secured to the base, a driving shaft journaled in the cover, a driving bevel gear secured to the shaft, a stud shaft journaled in the base, a driven bevel gear secured to the stud shaft and in mesh with the driving bevel gear, a driving pinion gear secured to the stud shaft, an intermediate stud shaft journaled in the base, a relatively small driven pinion gear secured to the intermediate stud shaft and in mesh with the driving pinion gear, an intermediate driving gear secured to the intermediate stud shaft and in mesh with one of the beater pinions, and a handle mounted on the driving shaft.

JAMES L. ANDREWS.